United States Patent
Sawada et al.

(10) Patent No.: US 11,589,638 B2
(45) Date of Patent: Feb. 28, 2023

(54) OUTSOLE AND SHOE

(71) Applicant: ASICS CORPORATION, Kobe (JP)

(72) Inventors: Daisuke Sawada, Kobe (JP); Kenichi Harano, Kobe (JP); Junichiro Tateishi, Kobe (JP)

(73) Assignee: ASICS CORPORATION, Kobe (JP)

( * ) Notice: Subject to any disclaimer, the term of this patent is extended or adjusted under 35 U.S.C. 154(b) by 336 days.

(21) Appl. No.: 16/755,149

(22) PCT Filed: Oct. 13, 2017

(86) PCT No.: PCT/JP2017/037219
§ 371 (c)(1),
(2) Date: Apr. 9, 2020

(87) PCT Pub. No.: WO2019/073600
PCT Pub. Date: Apr. 18, 2019

(65) Prior Publication Data
US 2020/0297062 A1    Sep. 24, 2020

(51) Int. Cl.
| | | |
|---|---|---|
| C08L 21/00 | (2006.01) | |
| A43B 1/10 | (2006.01) | |
| A43B 13/04 | (2006.01) | |
| A43B 13/22 | (2006.01) | |

(52) U.S. Cl.
CPC ............... *A43B 1/10* (2013.01); *C08L 21/00* (2013.01); *A43B 13/04* (2013.01)

(58) Field of Classification Search
None
See application file for complete search history.

(56) References Cited

U.S. PATENT DOCUMENTS

| | | | |
|---|---|---|---|
| 6,032,388 A | 3/2000 | Fram | |
| 9,930,928 B2 | 4/2018 | Whiteman et al. | |
| 9,956,732 B2 | 5/2018 | Murphy et al. | |
| 2005/0027025 A1* | 2/2005 | Erb | A43B 17/003 521/50 |
| 2010/0047550 A1 | 2/2010 | Prissok et al. | |
| 2014/0223777 A1 | 8/2014 | Whiteman et al. | |
| 2015/0252163 A1* | 9/2015 | Prissok | A43B 13/00 521/174 |
| 2016/0039162 A1 | 2/2016 | Murphy et al. | |
| 2018/0206591 A1 | 7/2018 | Whiteman et al. | |
| 2018/0208733 A1* | 7/2018 | Tayagaki | C08L 9/02 |
| 2020/0032022 A1 | 1/2020 | Prissok et al. | |
| 2020/0046067 A1 | 2/2020 | Yamade | |

FOREIGN PATENT DOCUMENTS

| | | |
|---|---|---|
| CN | 101583656 A | 11/2009 |
| EP | 3 578 068 A1 | 12/2019 |
| JP | S52-137954 U | 10/1977 |
| JP | 2001-002814 A | 1/2001 |
| JP | 2001-510389 A | 7/2001 |
| JP | 4154502 B2 | 9/2008 |
| JP | 2014-151210 A | 8/2014 |
| JP | 6116787 B1 | 4/2017 |
| JP | 2017-523928 A | 8/2017 |
| WO | 2006/015440 A1 | 2/2006 |
| WO | 2008/087078 A1 | 7/2008 |
| WO | 2017/014064 A1 | 1/2017 |

OTHER PUBLICATIONS

An Office Action mailed by China National Intellectual Property Administration dated Mar. 2, 2021, which corresponds to Chinese Patent Application No. 201780095703.9 and is related to U.S. Appl. No. 16/755,149; with English language translation.
International Search Report issued in PCT/JP2017/037219; dated Nov. 7, 2017.
Notification of Transmittal of Translation of the International Preliminary Report on Patentability (Chapter I) and Translation of Written Opinion of the International Searching Authority, PCT/JP2017/037219 dated Apr. 23, 2020.
The extended European search report issued by the European Patent Office dated May 29, 2020, which corresponds to European Patent Application No. 17928599.4-1011 and is related to U.S. Appl. No. 16/755,149.
An Office Action mailed by China National Intellectual Property Administration dated Aug. 9, 2021, which corresponds to Chinese Patent Application No. 201780095703.9 and is related to U.S. Appl. No. 16/755,149; with English language translation.

* cited by examiner

*Primary Examiner* — Sheeba Ahmed
(74) *Attorney, Agent, or Firm* — Studebaker & Brackett PC

(57) ABSTRACT

Provided in the present invention is a shoe that has a ground engaging surface with a simplified structure and that is excellent in lightweight properties since an outsole is composed of an elastomer sheet including a sheet body and foamed polymer particles dispersed in the sheet body.

8 Claims, 2 Drawing Sheets

OUTSOLE AND SHOE

FIELD

The present invention relates to an outsole and a shoe including the outsole.

BACKGROUND

Shoes such as sports shoes conventionally are made up of many members. For example, a sole is made up of members such as an inner sole, a sock liner, a midsole, and an outsole. Shoes are required to have functions of not only giving comfortable wearing feeling to the wearer, but also supporting the wearer's motion, such as running and stopping. Thus, a conventional shoe has a ground engaging surface provided with projections and recesses formed into complicated shapes (see Patent Literature 1 below). The outsole constituting such a ground engaging surface is conventionally composed of an elastomer sheet such as an uncrosslinked rubber sheet or a crosslinked rubber sheet, in order to exhibit excellent grip performance.

CITATION LIST

Patent Literature

Patent Literature 1: JP 2001-510389 T

SUMMARY

Technical Problem

A shoe with the ground engaging surface having projections and recesses not only exhibits excellent grip performance against the ground due to the edges of the projections, but also exhibits excellent grip performance in that the projections are easily deformable to thereby allow the ground engaging surface to have a relatively large contact area with the ground. A shoe including an outsole having ridges and grooves arranged alternately can cause the edges of the ridges to intrude into the recesses of the ground, and even when protrusions formed, for example, of gravels are present on the ground, each adjacent ridges of the shoe are forced away from each other allowing the protrusions to intrude into the groove therebetween, thereby suppressing the ground and the outsole from being in point contact with each other.

Usually, the aforementioned effects are remarkably exerted by the projections having a certain height. However, high projections and deep recesses formed on a shoe sole may result in a thick shoe sole and thereby result in a heavy shoe. Further, a shoe provided with a ground engaging surface having deep recesses, into which gravels or the like are liable to be stuck, may impair its comfortable wearing feeling.

It is therefore an object of the present invention to provide an outsole helpful for simplifying the structure of a ground engaging surface and useful for reducing the weight of a shoe, and to therefore provide a shoe capable of giving a wearer a feeling of lightness.

Solution to Problem

In order to solve the above problem, provided in the present invention is an outsole including at least one elastomer sheet constituting a ground engaging surface, the at least one elastomer sheet including: a sheet body composed of an elastomer; and a plurality of polymer particles dispersed in the sheet body, and the plurality of polymer particles being foamed particles each having a plurality of voids therein.

Further, in order to solve the above problem, the present invention provides a shoe including the outsole.

DESCRIPTION OF EMBODIMENTS

Figure 1:
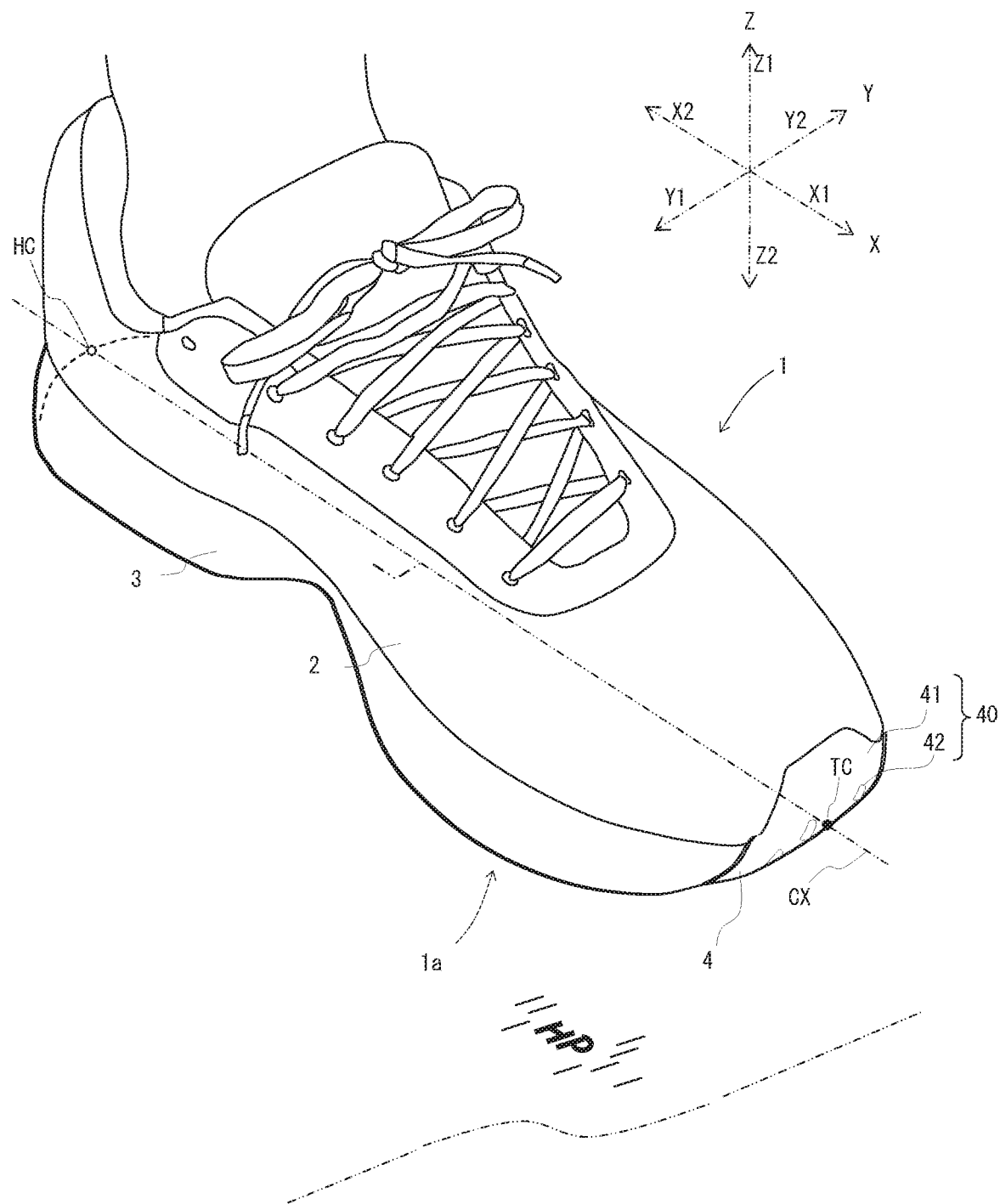
FIG. 1 is a schematic perspective view showing one form of a shoe.

The present invention will be hereinafter described by way of embodiments with reference to the drawings. As shown in FIG. 1, a shoe 1 of this embodiment has an upper material 2, a midsole 3, and an outsole 4.

The shoe 1 of this embodiment has a shoe center axis Cx connecting an end of a heel portion HC and an end of a toe portion TC. Hereinafter, the dimension of the shoe 1, a foot, or the like in a direction X along the shoe center axis Cx is referred to as "length", a direction X1 in the direction X toward the toe is referred to as, for example, "front", and a direction X2 toward the heel is referred to as, for example, "rear". Further, hereinafter, a direction Y orthogonal to the length direction X and parallel to a horizontal plane HP when the shoe 1 is naturally placed on the horizontal plane HP is referred to as "width direction", and a direction Y1 in the direction Y toward the medial side of the shoe is referred to as, for example, "inward side", and a direction Y2 toward the lateral side of the shoe is referred to as, for example, "outward side". A direction Z orthogonal to the horizontal plane HP is referred to as "height direction", "vertical direction", or "thickness direction", an ascending direction Z1 in the direction Z is referred to as, for example, "upper side", and a descending direction Z2 is referred to as, for example, "lower side".

Figure 2:
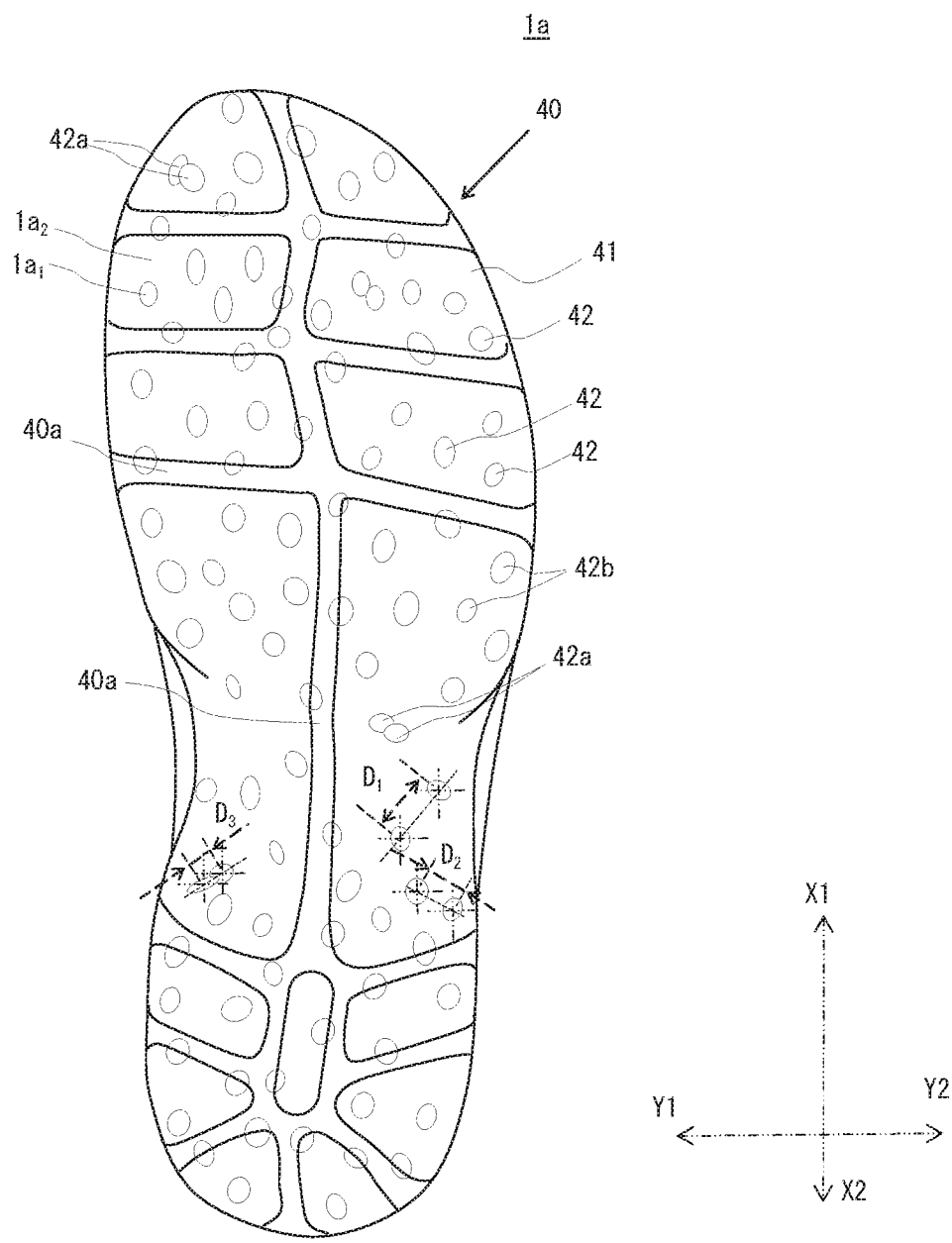
FIG. 2 is a schematic plan view showing an outsole as viewed from a ground engaging surface side of the shoe.

As shown in FIG. 2, the shoe 1 of this embodiment has the entire midsole 3 covered with the outsole 4, as viewed from the side of a ground engaging surface 1a. The outsole 4 of this embodiment is composed of one elastomer sheet 40.

The elastomer sheet 40 in a substantially horizontal state has an upper side adhering to a lower side of the midsole 3 and a lower side serving as the ground engaging surface 1a of the shoe. The elastomer sheet 40 includes a plurality of polymer particles that have been foamed, and the elastomer sheet 40 includes a sheet body 41 and a plurality of polymer particles 42 dispersed in the sheet body 41. Herein, a description is given by taking, for example, the case where the outsole 4 is composed of one elastomer sheet 40, the outsole 4 may be composed of a plurality of elastomer sheets 40. That is, the outsole 4 is an outsole 4 including at least one elastomer sheet 40 constituting the ground engaging surface 1a, the at least one elastomer sheet 40 including: the sheet body 41 composed of an elastomer; and the plurality of polymer particles 42 dispersed in the sheet body 41, the plurality of polymer particles 42 being foamed particles having a plurality of voids therein.

In the outsole 4 of this embodiment, mechanical performance characteristics vary depending on the measurement position since the elastomer sheet 40 includes the polymer particles 42 and the ground engaging surface 1a has a first area $1a_1$ in which the polymer particles 42 are present thereabove and a second area $1a_2$ in which no polymer particle 42 is present thereabove. More specifically in the outsole 4 of this embodiment, the behavior of compressive deformation of the elastomer sheet 40 when pressure upward is applied to the ground engaging surface 1a is different between the first area $1a_1$ in which the polymer particles 42 are present and the second area $1a_2$ in which no polymer particle 42 is present. In the case where the polymer particles 42 are less elastic than the sheet body 41, the portions in which the polymer particles 42 are present function as if they are recesses of an outsole having an uneven surface. On the other hand, in the case where the polymer particles 42 are more elastic than the sheet body 41, the portions in which the polymer particles 42 are present function as if they are projections of an outsole having an uneven surface. The lower side of the elastomer sheet 40 of this embodiment is in a substantially flat state although having a shallow groove 40a slightly recessed upward. The shoe 1 of this embodiment has the ground engaging portion with no significantly uneven structure, and thus can be suppressed from having a thick shoe sole resulting from the formation of the uneven structure. Further, the shoe 1 includes the outsole 4 partially composed of the foamed polymer particles 42, and thus exerts excellent lightweight properties. The shoe 1 of this embodiment can be easily produced in that the ground engaging surface 1a does not have an excessively complicated shape.

It is preferable that the elastomer sheet 40 constituting the outsole 4 have a thickest part having a thickness of 15 mm or less in order to allow the shoe 1 to exert excellent lightweight properties. It is more preferable that the thickest part of the elastomer sheet 40 have a thickness of 10 mm or less. The average thickness of the elastomer sheet 40 is preferably 10 mm or less, more preferably 8 mm or less. The average thickness (t (mm)) of the elastomer sheet 40 is determined by dividing the volume (V ($cm^3$)) of the elastomer sheet 40 by the area (S ($cm^2$)) of the outline shape of the elastomer sheet 40 obtained by projecting the elastomer sheet 40 onto the horizontal plane HP (t=V/S). The average thickness (t (mm)) is usually 1 mm or more.

The elastomer sheet 40 of this embodiment is configured not to cause the polymer particles to protrude from its upper or lower surface in order to exert excellent adhesiveness to the midsole 3 and in order to allow the ground engaging surface 1a to provide excellent grip performance. Accordingly, in this embodiment, the thickness of each part of the elastomer sheet 40 is essentially common with the thickness of the sheet body 41. That is, the sheet body 41 of this embodiment has a thickness of about 1 to 15 mm.

The polymer particles 42 are dispersed in this sheet body 41. The polymer particles 42 in this embodiment are mostly uniformly dispersed in the entire outsole. The proportion of the polymer particles 42 present may differ between the front side and the rear side of the shoe, or may differ between the inward side and the outward side in the width direction of the shoe.

In order to ensure that the polymer particles 42 are present inside the sheet body 41 so that they are not exposed on the surfaces of the elastomer sheet 40, the polymer particles 42 each preferably have a volume of 100 $mm^3$ or less at the largest. The average volume of the polymer particles 42 is preferably 75 $mm^3$ or less per particle, more preferably 65 $mm^3$ or less per particle. The polymer particles should each have a certain size or larger to advantageously reduce the weight of the shoe 1, Thus, the average volume of the polymer particles 42 is preferably 0.5 $mm^3$ or more per particle, more preferably 1 $mm^3$ or more per particle. The average volume of the polymer particles can be determined by, for example, obtaining the respective volumes of 10 to 20 polymer particles 42 randomly selected from the elastomer sheet 40 and arithmetically averaging all the obtained values of the volumes.

The proportion of the polymer particles 42 to the elastomer sheet 40 is not particularly limited, but is preferably 20 volume % or less, more preferably 10 volume % or less, further preferably 5 volume % or less, most preferably 1 volume % or less, in order to allow the outsole 4 to exert excellent strength. On the other hand, the proportion of the polymer particles 42 to the elastomer sheet 40 is not particularly limited, but is preferably 0.01 volume % or more, more preferably 0.05 volume % or more, in view of the lightweight properties of the shoe 1.

It is preferable that the polymer particles 42 in the elastomer sheet 40 be not aggregated but individually isolated from each other in the sheet body, in order to effectively exert their function. Specifically, the average value of center-to-center distances between adjacent polymer particles 42 in the elastomer sheet 40 (i.e., distances in the horizontal direction: $D_1, D_2, D_3 \ldots$) is preferably 1 mm or more, more preferably 2 mm or more, particularly preferably 5 mm or more. The average value of the center-to-center distances is preferably 30 mm or less, more preferably 25 mm or less.

It is preferable that the plurality of polymer particles 42 include a small proportion of polymer particles 42a that are held in contact with each other as shown in FIG. 2 but include a large proportion of isolated particles 42b that are not held in contact with each other, and that the proportion in the number of the isolated particles 42b to all the polymer particles 42 in the elastomer sheet 40 be 50% or more. The proportion in the number of the isolated particles 42b is preferably 60% or more, more preferably 75% or more.

The proportion in the number and the center-to-center distances of the isolated particles 42b can be measured using the elastomer sheet 40 as it is if, for example, the sheet body 41 has light permeability and thereby allows the presence of the polymer particles 42 therein to be directly visible from outside, or allows the presence of the polymer particles 42 to be visible when the sheet body 41 is illuminated with light from a side thereof and observed from the other side. If the sheet body 41 is opaque and thus causes the presence of the polymer particles 42 to be hardly visible from outside, the proportion in the number and the center-to-center distances of the isolated particles 42b can be measured using the elastomer sheet 40 that has been, for example, sliced at the center in the thickness direction.

In order to better ensure to produce the elastomer sheet 40 in a preferable condition as aforementioned, the polymer particles 42 may be interposed between two elastomer sheets constituting the sheet body 41, followed by hot-pressing, to integrate the two elastomer sheets with each other. A specific description in this regard will be given by taking, for example, the case where the sheet body 41 is formed of a thermoplastic elastomer. The elastomer sheet 40 can be produced by; preparing two thermoplastic elastomer sheets each having an area larger than that of the elastomer sheet 40; interposing the polymer particles between these sheets to produce a laminated body; cutting out a preliminarily molded product having a shape corresponding to that of the elastomer sheet 40 from the laminated body; placing the preliminarily molded product in a forming mold constituted by a male mold and a female mold that form an internal space corresponding to the shape of the elastomer sheet 40 when the mold is closed; and hot-pressing the preliminarily molded product at temperature conditions at which the thermoplastic elastomer is heat-sealed.

A similar hot-pressing method can be applied also in the case where a crosslinked rubber sheet is used as the sheet body 41. That is, the elastomer sheet 40 can be produced by: preparing two uncrosslinked rubber sheets larger than the elastomer sheet 40; interposing the polymer particles between these sheets to produce a laminated body; cutting out a preliminarily molded product having a shape corresponding to that of the elastomer sheet 40 from the laminated body; placing the preliminarily molded product in the molding space; and applying pressure to the preliminarily molded product using the male mold and the female mold at temperature conditions at which the two uncrosslinked rubber sheets are crosslinked and integrated together.

The sheet body is preferably formed of a crosslinked rubber to allow the outsole 4 to have excellent abrasion resistance. At the time of crosslinking a rubber, there are some cases where the rubber partially turns into a sponge-like form to thereby fail to exert sufficient strength unless a relatively high pressure is generated in the mold. In order to ensure that the sheet body is in a non-foamed state to be clearly distinguished from the polymer particles 42 in terms of their behavior under compressive deformation, it is preferable to perform the hot-pressing under high pressure. However, there is a possibility that the polymer particles 42 are crushed to thereby decrease their degree of foaming or partially turn into a non-foamed state if the pressing is performed under high pressure when producing the elastomer sheet 40. For the purpose of avoiding this possibility foamed particles each having a plurality of voids therein are employed as the polymer particles 42 in this embodiment rather than balloon-shaped foamed particles each having only one internal void, and in terms of the abovementioned, it is preferable to employ foamed particles having excellent heat resistance as the polymer particles 42. It is preferable to employ those composed of a thermoplastic elastomer as the polymer particles 42. Among the thermoplastic elastomers, formed particles composed of a polyurethane-based thermoplastic elastomer (TPU) are preferable as the polymer particles 42 in that they are excellent in heat resistance and abrasion resistance. The polyurethane-based thermoplastic elastomer (TPU) forming the polymer particles 42 is preferable, for example, in that it has a molecular structure including a polyol-derived first structural unit and a polyisocyanate-derived second structural unit and that the elastomer having a polyether polyol-derived structural unit as the first structural unit is excellent in hydrolysis resistance.

The polymer particles 42 are preferably foamed in advance of producing the elastomer sheet 40, but for the purpose of preventing the polymer particles 42 from being crushed in the course of producing the elastomer sheet 40, it is preferable that the polymer particles 42 have their foaming power remaining. That is, it is preferable that a foam agent included in the polymer particles 42 be used for turning the polymer particles 42 into a foamed state in advance but partially remain unused, and allow the polymer particles 42 to exert their foaming power at the time of the production of the elastomer sheet 40. The polymer particles 42 used for producing the elastomer sheet 40 preferably include, for example, 0.1 mass % to 3 mass % of a physical foam agent such as hydrocarbon.

The polymer particles 42 may be coated with other polymers and dispersed in the sheet body for the purpose of achieving improved adhesiveness to the sheet body 41 or making them difficult to be deformed by external forces. The coating applied to the polymer particles 42 primarily for the former purpose can be performed, for example, using a coating agent including an adhesive component such as rosin, a silane coupling agent, or the like. The coating applied to the polymer particles 42 primarily for the latter purpose can be performed, for example, using a coating agent including a hard resin such as an epoxy resin, an inorganic filler, or the like.

The polymer particles 42 of this embodiment are preferably formed of a polymer composition including a polyurethane-based thermoplastic elastomer as described above, but may be composed of a composition other than such a polymer composition. The polymer particles 42 may be composed of a polymer composition including, for example, one or more of a polyurethane-based thermoplastic elastomer (TPU), polyethylene (PE), polypropylene (PP), an ethylene-vinyl acetate copolymer (EVA), a polyamide-based elastomer (PA), polyether block amide (PEBA), polystyrene (PS), polyoxymethylene (POM), polyoxyethylene (POE) and a polyester-based elastomer (PET, PBT). The polymer composition forming the polymer particles 42 may be selected appropriately based on thermal resistance and abrasion resistance required for the outsole, and affinity for the elastomer constituting the sheet body 41. For example, in the case where excellent heat resistance is required for the outsole 4, the polymer constituting the polymer particles 42 may suitably include one or more of a polyurethane-based thermoplastic elastomer, polypropylene, a polyamide-based elastomer, polyether block amide, and a polyester-based elastomer.

The elastomer constituting the sheet body 41 may be any elastomer suitable as an elastomer constituting the ground engaging surface of an outsole, such as a crosslinked rubber or a thermoplastic elastomer. The elastomer constituting the sheet body 41 can be appropriately selected based on hardness, durability, or the like required for the outsole. For example, in the case where the outsole 4 is an outsole for running shoes, the shore A hardness of the elastomer constituting the sheet body 41 is preferably 40 to 90.

Conventionally known materials can be used for the members other than the outsole that constitute the shoe 1, such as the upper member 2 and the midsole 3. The shoe 1 provided with the aforementioned outsole 4 exerts excellent lightweight properties to thereby effectively give the wearer a feeling of lightness.

The outsole and shoe according to the present invention is not limited to the abovementioned embodiment, but various modifications can be made without departing from the gist of the present invention.

For example, in the outsole according to the present invention, the polymer particles dispersed in the sheet body may not necessarily be uniformly dispersed in the entire outsole. For example, the polymer particles may concentrate in a certain portion of an outsole, such as a heel portion or a forefoot portion of the outsole. In the case where the polymer particles concentrate in a certain portion of an outsole as described above, the mechanical performance characteristics in a desired portion of the outsole can be effectively adjusted.

REFERENCE SIGNS LAST

1: Shoe

2: Upper sole

3: Midsole

4: Outsole

40: Elastomer sheet

41: Sheet body

42: Polymer particle

42*b*: Isolated particle

The invention claimed is:

1. An outsole comprising:
   at least one elastomer sheet constituting a ground engaging surface,
   the at least one elastomer sheet comprising: a sheet body composed of an elastomer; and a plurality of polymer particles dispersed in the sheet body, and
   the plurality of polymer particles being foamed particles each having a plurality of voids therein, wherein
   the average volume of the plurality of polymer particles is 0.5 mm$^3$ or more per particle and 75 mm$^3$ or less per particle.

2. The outsole according to claim 1, wherein the elastomer constituting the sheet body is a crosslinked rubber, and the plurality of polymer particles are thermoplastic polyurethane particles.

3. The outsole according to claim 1, wherein the plurality of polymer particles comprise isolated particles that are not held in contact with each other, and the proportion in the number of the isolated particles to all of the plurality of polymer particles in the at least one elastomer sheet is 50% or more.

4. A shoe comprising the outsole according to claim 1.

5. A shoe comprising the outsole according to claim 2.

6. A shoe comprising the outsole according to claim 3.

7. The outsole according to claim 1, wherein the average volume of the plurality of polymer particles is 1 mm$^3$ or more per particle and 65 mm$^3$ or less per particle.

8. The outsole according to claim 1, wherein an average value of a center-to-center distance between adjacent ones of the plurality of polymer particles is 5 mm or more and 30 mm or less.

* * * * *